(12) United States Patent
Mitani et al.

(10) Patent No.: US 11,855,467 B2
(45) Date of Patent: Dec. 26, 2023

(54) POWER SUPPLY CIRCUIT

(71) Applicant: HONDA MOTOR CO., LTD., Tokyo (JP)

(72) Inventors: Manabu Mitani, Wako (JP); Sadao Shinohara, Wako (JP); Akinori Kita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/684,465

(22) Filed: Mar. 2, 2022

(65) Prior Publication Data
US 2022/0285964 A1    Sep. 8, 2022

(30) Foreign Application Priority Data

Mar. 5, 2021    (JP) .................................. 2021-035415

(51) Int. Cl.
*H02J 7/00*    (2006.01)
*H02H 3/08*    (2006.01)

(52) U.S. Cl.
CPC ........... *H02J 7/00304* (2020.01); *H02H 3/08* (2013.01); *H02J 7/0013* (2013.01)

(58) Field of Classification Search
CPC ...... H02J 7/00304; H02J 7/0013; H02J 1/084; H02J 1/10; H02J 9/068; H02J 7/0063; H02J 7/0068; H02H 3/08; H02H 3/087
See application file for complete search history.

(56) References Cited

U.S. PATENT DOCUMENTS

2019/0131804 A1* 5/2019 Taniguchi ............. B60R 16/033

FOREIGN PATENT DOCUMENTS

JP    2017-195651    10/2017

* cited by examiner

*Primary Examiner* — Lincoln D Donovan
*Assistant Examiner* — Alex W Lam
(74) *Attorney, Agent, or Firm* — AMIN, TUROCY & WATSON, LLP

(57) ABSTRACT

A power supply circuit includes a load cable connecting a first battery and a first load; a load cable connecting a second battery and a second load; a transistor provided between a first generator and the load cable; and a transistor provided between the first generator and the load cable, wherein the transistors are turned OFF in a case where power is to be supplied from the first generator to the first load and second load.

5 Claims, 7 Drawing Sheets

US 11,855,467 B2

POWER SUPPLY CIRCUIT

CROSS-REFERENCE TO RELATED APPLICATIONS

This application is based upon and claims the benefit of priority from Japanese Patent Application No. 2021-035415 filed on Mar. 5, 2021, the contents of which are incorporated herein by reference.

BACKGROUND OF THE INVENTION

Field of the Invention

The present invention relates to a power supply circuit.

Description of the Related Art

JP 2017-195651 A discloses a system including a power generator, a main battery, a sub battery, a first switch section, and a second switch section. The power generator supplies power to a main load and a sub load. The main battery supplies power to the main load. The sub battery supplies power to the sub load. The first switch section is provided in parallel with a diode that allows the flow of current from the power generator to the main load. The second switch section is provided in parallel with a diode that allows the flow of current from the power generator to the sub load.

SUMMARY OF THE INVENTION

In JP 2017-195651 A described above, the second switch section is turned OFF in a case where the first switch section is turned ON. Furthermore, the first switch section is turned OFF in a case where the second switch section is turned ON. As an example, in a case where an abnormality such as a short circuit occurs in the conductive path connecting the sub battery and the sub load in a case where the first switch is ON, there is a concern that not only the sub battery, but also the main battery, will discharge. Therefore, there is a problem that power is supplied to neither the main battery nor the sub battery.

The present invention has been devised taking into consideration the aforementioned problem, and has the object of providing a power supply circuit that, even when it becomes impossible to supply power to one of two loads, can continue supplying power to the other of the two loads.

The first aspect of the present invention includes a first conduction path that electrically connects a first power storage section and a first load; a second conduction path that electrically connects a second power storage section and a second load; a power generator that supplies power to the first load and the second load, through the first conduction path and the second conduction path; a first element that is provided in series between the power generator and the first conduction path, allows the flow of current from the power generator side to the first conduction path side, and regulates the flow of current from the first conduction path side to the power generator side; a second element that is provided in series between the power generator and the second conduction path, allows the flow of current from the power generator side to the second conduction path side, and regulates the flow of current from the second conduction path side to the power generator side; a first switch that is provided in parallel with the first element and switches between ON, which electrically connects the power generator and the first conduction path, and OFF, which electrically disconnects the power generator from the first conduction path; and a second element that is provided in parallel with the second element and switches between ON, which electrically connects the power generator and the second conduction path, and OFF, which electrically disconnects the power generator from the second conduction path, wherein, in a case where power is to be supplied from the power generator to the first load and the second load, the first switch and the second switch are turned OFF.

According to the present invention, even when it becomes impossible to supply power to one of two loads, it is possible to continue supplying power to the other of the two loads.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

First Embodiment

Figure 1:
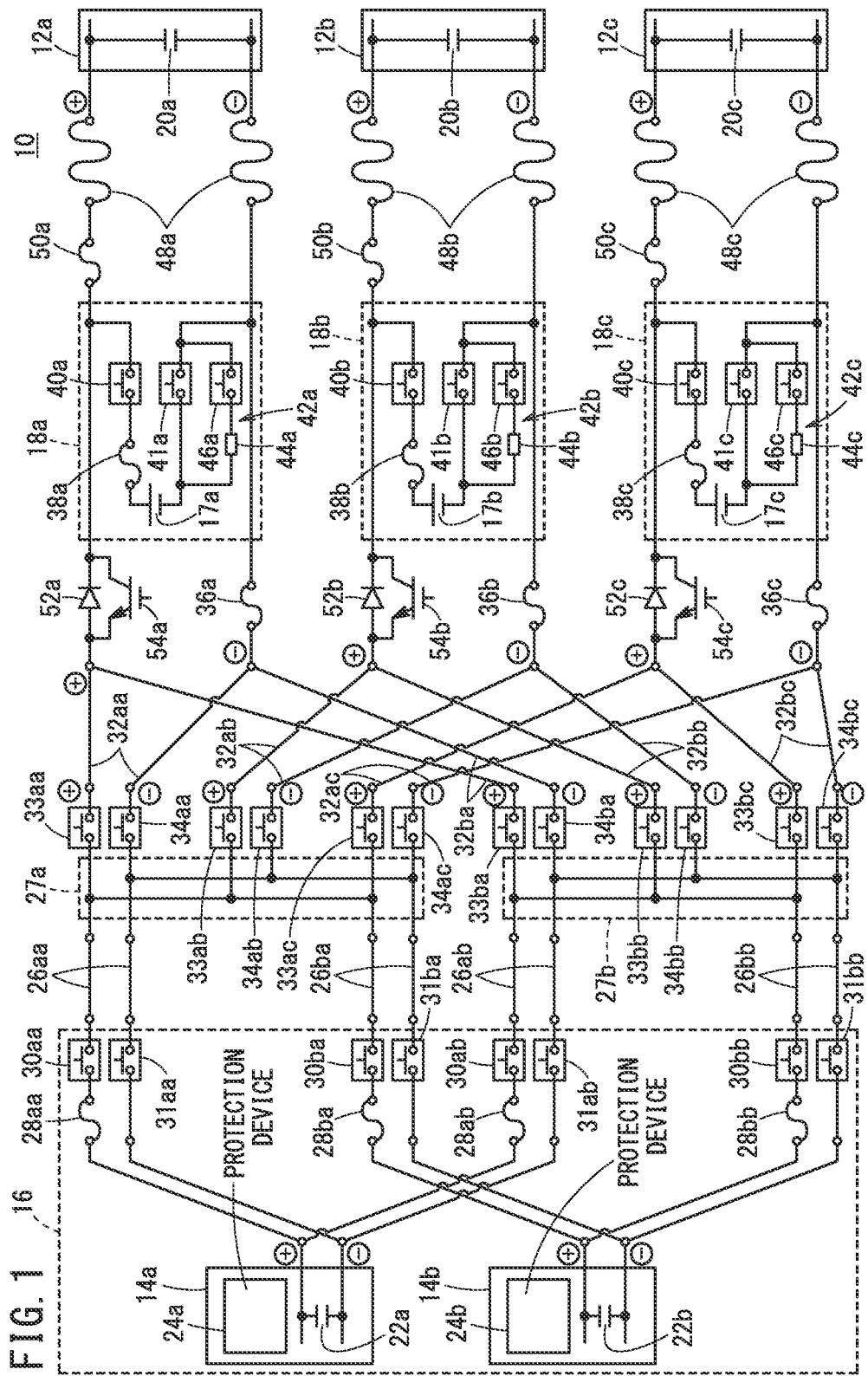
FIG. 1 is a circuit diagram of a power supply circuit.

FIG. 1 is a circuit diagram of a power supply circuit 10 according to the present embodiment. The power supply circuit 10 supplies power to three loads, which are a first load 12a, a second load 12b, and a third load 12c. Below, when no particular distinction is being made between the first load 12a, the second load 12b, and the third load 12c, the term "load 12" is used.

The power supply circuit 10 includes a power control unit 16, a first intelligent power unit 18a, a second intelligent power unit 18b, and a third intelligent power unit 18c. Below, the power control unit may be referred to as a PCU. Below, the intelligent power unit may be referred to as an IPU.

The PCU 16 includes a first generator 14a and a second generator 14b as power sources. Below, when no particular distinction is being made between the first generator 14a and the second generator 14b, the term "generator 14" is used. The first IPU 18a includes a first battery 17a as a power source. The second IPU 18b includes a second battery 17b as a power source. The third IPU 18c includes a third battery 17c as a power source. Below, when no particular distinction is being made between the first battery 17a, the second battery 17b, and the third battery 17c, the term "battery 17" is used.

The first load 12a includes a capacitor 20a therein. The second load 12b includes a capacitor 20b therein. The third load 12c includes a capacitor 20c therein. The first load 12a corresponds to a first load of the present invention. The second load 12*b* corresponds to a second load of the present invention.

The first generator 14*a* includes a capacitor 22*a* therein. The second generator 14*b* includes a capacitor 22*b* therein. The first generator 14*a* includes a protection device 24*a*. The protection device 24*a* stops the first generator 14*a* when overcurrent is detected. The second generator 14*b* includes a protection device 24*b*. The protection device 24*b* stops the second generator 14*b* when overcurrent is detected. The first generator 14*a* corresponds to a power generator of the present invention.

The first generator 14*a* is connected to a first common bus 27*a* by a PCU bus bar 26*aa*, and is connected to a second common bus 27*b* by a PCU bus bar 26*ab*. The second generator 14*b* is connected to the first common bus 27*a* by a PCU bus bar 26*ba*, and to the second common bus 27*b* by a PCU bus bar 26*bb*. The first generator 14*a* and the second generator 14*b* are connected in parallel by the first common bus 27*a*. The first generator 14*a* and the second generator 14*b* are connected in parallel by the second common bus 27*b*. Each of the PCU bus bars 26*aa*, 26*ab*, 26*ba*, and 26*bb* may be multiplexed.

A PCU fuse 28*aa* and a PCU switch 30*aa* are provided on a positive electrode wire connecting the first generator 14*a* and the PCU bus bar 26*aa*. The PCU fuse 28*aa* and the PCU switch 30*aa* are connected in series. A PCU switch 31*aa* is provided on the negative electrode wire connecting the first generator 14*a* and the PCU bus bar 26*aa*. It should be noted that, instead, only one of the PCU switch 30*aa* and the PCU switch 31*aa* may be provided.

A PCU fuse 28*ab* and a PCU switch 30*ab* are provided on a positive electrode wire connecting the first generator 14*a* and the PCU bus bar 26*ab*. The PCU fuse 28*ab* and the PCU switch 30*ab* are connected in series. A PCU switch 31*ab* is provided on the negative electrode wire connecting the first generator 14*a* and the PCU bus bar 26*ab*. It should be noted that, instead, only one of the PCU switch 30*ab* and the PCU switch 31*ab* may be provided.

A PCU fuse 28*ba* and a PCU switch 30*ba* are provided on a positive electrode wire connecting the second generator 14*b* and the PCU bus bar 26*ba*. The PCU fuse 28*ba* and the PCU switch 30*ba* are connected in series. A PCU switch 31*ba* is provided on the negative electrode wire connecting the second generator 14*b* and the PCU bus bar 26*ba*. It should be noted that, instead, only one of the PCU switch 30*ba* and the PCU switch 31*ba* may be provided.

A PCU fuse 28*bb* and a PCU switch 30*bb* are provided on a positive electrode wire connecting the second generator 14*b* and the PCU bus bar 26*bb*. The PCU fuse 28*bb* and the PCU switch 30*bb* are connected in series. A PCU switch 31*bb* is provided on the negative electrode wire connecting the second generator 14*b* and the PCU bus bar 26*bb*. It should be noted that, instead, only one of the PCU switch 30*bb* and the PCU switch 31*bb* may be provided.

The first common bus 27*a* is connected to the first IPU 18*a* by an IPU bus bar 32*aa*, connected to the second IPU 18*b* by an IPU bus bar 32*ab*, and connected to the third IPU 18*c* by an IPU bus bar 32*ac*. The second common bus 27*b* is connected to the first IPU 18*a* by an IPU bus bar 32*ba*, connected to the second IPU 18*b* by an IPU bus bar 32*bb*, and connected to the third IPU 18*c* by an IPU bus bar 32*bc*. Each of the IPU bus bars 32*aa*, 32*ab*, 32*ac*, 32*ba*, 32*bb*, and 32*bc* may be multiplexed.

A common bus switch 33*aa* is provided on the positive electrode wire connecting the first common bus 27*a* and the IPU bus bar 32*aa*. A common bus switch 34*aa* is provided on the negative electrode wire connecting the first common bus 27*a* and the IPU bus bar 32*aa*. It should be noted that, instead, only one of the common bus switch 33*aa* and the common bus switch 34*aa* may be provided.

A common bus switch 33*ab* is provided on the positive electrode wire connecting the first common bus 27*a* and the IPU bus bar 32*ab*. A common bus switch 34*ab* is provided on the negative electrode wire connecting the first common bus 27*a* and the IPU bus bar 32*ab*. It should be noted that, instead, only one of the common bus switch 33*ab* and the common bus switch 34*ab* may be provided.

A common bus switch 33*ac* is provided on the positive electrode wire connecting the first common bus 27*a* and the IPU bus bar 32*ac*. A common bus switch 34*ac* is provided on the negative electrode wire connecting the first common bus 27*a* and the IPU bus bar 32*ac*. It should be noted that, instead, only one of the common bus switch 33*ac* and the common bus switch 34*ac* may be provided.

A common bus switch 33*ba* is provided on the positive electrode wire connecting the second common bus 27*b* and the IPU bus bar 32*ba*. A common bus switch 34*ba* is provided on the negative electrode wire connecting the second common bus 27*b* and the IPU bus bar 32*ba*. It should be noted that, instead, only one of the common bus switch 33*ba* and the common bus switch 34*ba* may be provided.

A common bus switch 33*bb* is provided on the positive electrode wire connecting the second common bus 27*b* and the IPU bus bar 32*bb*. A common bus switch 34*bb* is provided on the negative electrode wire connecting the second common bus 27*b* and the IPU bus bar 32*bb*. It should be noted that, instead, only one of the common bus switch 33*bb* and the common bus switch 34*bb* may be provided.

A common bus switch 33*bc* is provided on the positive electrode wire connecting the second common bus 27*b* and the IPU bus bar 32*bc*. A common bus switch 34*bc* is provided on the negative electrode wire connecting the second common bus 27*b* and the IPU bus bar 32*bc*. It should be noted that, instead, only one of the common bus switch 33*bc* and the common bus switch 34*bc* may be provided.

An IPU fuse 36*a* is provided on the negative electrode wire connecting the first IPU 18*a* and the IPU bus bar 32*aa* and IPU bus bar 32*ba*. An IPU fuse 36*b* is provided on the negative electrode wire connecting the second IPU 18*b* and the IPU bus bar 32*ab* and IPU bus bar 32*bb*. An IPU fuse 36*c* is provided on the negative electrode wire connecting the third IPU 18*c* and the IPU bus bar 32*ac* and IPU bus bar 32*bc*.

The first battery 17*a* is provided in parallel with each of the first generator 14*a* and the second generator 14*b*. The second battery 17*b* is provided in parallel with each of the first generator 14*a* and the second generator 14*b*. The third battery 17*c* is provided in parallel with each of the first generator 14*a* and the second generator 14*b*. The first battery 17*a* corresponds to a first power storage section of the present invention. The second battery 17*b* corresponds to a second power storage section of the present invention.

A battery fuse 38*a* and a battery switch 40*a* are connected to the positive electrode of the first battery 17*a*. The battery fuse 38*a* and the battery switch 40*a* are connected in series. A battery fuse 38*b* and a battery switch 40*b* are connected to the positive electrode of the second battery 17*b*. The battery fuse 38*b* and the battery switch 40*b* are connected in series. A battery fuse 38*c* and a battery switch 40*c* are connected to the positive electrode of the third battery 17*c*. The battery fuse 38*c* and the battery switch 40*c* are connected in series.

A battery switch 41*a* is connected to the negative electrode of the first battery 17*a*. A precharge circuit 42*a* is provided in parallel with the battery switch 41a. The precharge circuit 42a includes a resistor 44a and a precharge switch 46a. The resistor 44a and the precharge switch 46a are connected in series. A battery switch 41b is connected to the negative electrode of the second battery 17b. A precharge circuit 42b is provided in parallel with the battery switch 41b. The precharge circuit 42b includes a resistor 44b and a precharge switch 46b. The resistor 44b and the precharge switch 46b are connected in series. A battery switch 41c is connected to the negative electrode of the third battery 17c. A precharge circuit 42c is provided in parallel with the battery switch 41c. The precharge circuit 42c includes a resistor 44c and a precharge switch 46c. The resistor 44c and the precharge switch 46c are connected in series.

The first IPU 18a is electrically connected to the first load 12a by a load cable 48a. The second IPU 18b is electrically connected to the second load 12b by a load cable 48b. The third IPU 18c is electrically connected to the third load 12c by a load cable 48c. Below, when no particular distinction is being made between the load cable 48a, the load cable 48b, and the load cable 48c, the term "load cable 48" is used.

A load fuse 50a is provided on the positive electrode wire connecting the first IPU 18a and the load cable 48a. A load fuse 50b is provided on the positive electrode wire connecting the second IPU 18b and the load cable 48b. A load fuse 50c is provided on the positive electrode wire connecting the third IPU 18c and the load cable 48c. The load cable 48a corresponds to a first conductive path of the present invention. The load cable 48b corresponds to a second conductive path of the present invention.

The power generated by each of the first generator 14a and the second generator 14b is supplied to the first load 12a via the load cable 48a. The power generated by each of the first generator 14a and the second generator 14b is supplied to the second load 12b via the load cable 48b. The power generated by each of the first generator 14a and the second generator 14b is supplied to the third load 12c via the load cable 48c. The load cables 48 may be multiplexed.

A diode 52a is provided on the positive electrode wire connecting the first IPU 18a and the IPU bus bar 32aa and 32ba. The diode 52a allows the flow of current from the first generator 14a and second generator 14b toward the load cable 48a. On the other hand, the diode 52a regulates the flow of current from the load cable 48a toward the first generator 14a and second generator 14b. The diode 52a corresponds to a first element of the present invention.

A diode 52b is provided on the positive electrode wire connecting the second IPU 18b and the IPU bus bar 32ab and 32bb. The diode 52b allows the flow of current from the first generator 14a and second generator 14b toward the load cable 48b. On the other hand, the diode 52b regulates the flow of current from the load cable 48b toward the first generator 14a and second generator 14b. The diode 52b corresponds to a second element of the present invention.

A diode 52c is provided on the positive electrode wire connecting the third IPU 18c and the IPU bus bar 32ac and 32bc. The diode 52c allows the flow of current from the first generator 14a and second generator 14b toward the load cable 48c. On the other hand, the diode 52c regulates the flow of current from the load cable 48c toward the first generator 14a and second generator 14b.

A transistor 54a is provided in parallel with the diode 52a. When the transistor 54a is ON, the first generator 14a and second generator 14b are electrically connected to the load cable 48a while bypassing the diode 52a. The ON/OFF switching of the transistor 54a is controlled by a base current or a gate voltage. The transistor 54a corresponds to a first switch of the present invention.

A transistor 54b is provided in parallel with the diode 52b. When the transistor 54b is ON, the first generator 14a and second generator 14b are electrically connected to the load cable 48b while bypassing the diode 52b. The ON/OFF switching of the transistor 54b is controlled by a base current or a gate voltage. The transistor 54b corresponds to a second switch of the present invention.

A transistor 54c is provided in parallel with the diode 52c. When the transistor 54c is ON, the first generator 14a and second generator 14b are electrically connected to the load cable 48c while bypassing the diode 52c. The ON/OFF switching of the transistor 54c is controlled by a base current or a gate voltage.

A precharge circuit may be provided in parallel with the transistor 54a. When charging the capacitor 22a of the first generator 14a and the capacitor 22b of the second generator 14b with the power of the first battery 17a, the power is supplied to the capacitor 22a and the capacitor 22b through this precharge circuit. Due to this, it is possible to prevent inrush current when charging the capacitor 22a and the capacitor 22b.

A precharge circuit may be provided in parallel with the transistor 54b. When charging the capacitor 22a of the first generator 14a and the capacitor 22b of the second generator 14b with the power of the second battery 17b, the power is supplied to the capacitor 22a and the capacitor 22b through this precharge circuit. Due to this, it is possible to prevent inrush current when charging the capacitor 22a and the capacitor 22b.

A precharge circuit may be provided in parallel with the transistor 54c. When charging the capacitor 22a of the first generator 14a and the capacitor 22b of the second generator 14b with the power of the third battery 17c, the power is supplied to the capacitor 22a and the capacitor 22b through this precharge circuit. Due to this, it is possible to prevent inrush current when charging the capacitor 22a and the capacitor 22b.

In the power supply circuit 10 described above, the PCU 16 includes the first generator 14a and the second generator 14b. In other words, the PCU 16 includes two generators. Instead, the PCU 16 may include three or more generators.

Furthermore, the power supply circuit 10 described above includes the first IPU 18a, the second IPU 18b, and the third IPU 18c. In other words, the power supply circuit 10 includes three IPUs. Instead, the power supply circuit 10 may include two or more IPUs.

Yet further, high-capacity capacitors may be used instead of the first battery 17a, the second battery 17b, and the third battery 17c.

The power supply circuit 10 includes a computing section and a determining section (not shown in the drawings), and controls the transistors 54a, 54b, and 54c as well as each switch. The computing section and determining section can be realized by a processing circuit, for example.

The processing circuit can be formed by an integrated circuit such as an ASIC (Application Specific Integrated Circuit) or an FPGA (Field-Programmable Gate Array), for example. Furthermore, the processing circuit may be formed by an electronic circuit that includes discrete devices.

The processing circuit may be formed by a processor such as a CPU (Central Processing Unit) or GPU (Graphics Processing Unit), for example. In this case, the processing circuit can be realized by having a processor execute a program stored in a storage section (not shown in the drawings).

[Manipulation of the Transistors]

The following describes the manipulation of the transistors 54a, 54b, and 54c corresponding to the state of the power supply circuit 10. In order to simplify the description, the connection relationship among the first battery 17a, the second battery 17b, the first generator 14a, the first load 12a, and the second load 12b will be described schematically using FIGS. 2 to 7. In FIGS. 2 to 7, circuit configurations other than the PCU bus bar 26aa, the battery fuses 38a and 38b, the load cables 48a and 48b, the load fuses 50a and 50b, the diodes 52a and 52b, and the transistors 54a and 54b are omitted.

The following omits the descriptions of the operations and the like of the second generator 14b, the third battery 17c, and the transistor 54c. The operations and the like of the second generator 14b, the third battery 17c, and the transistor 54c are similar to the operations and the like of the first generator 14a, the first battery 17a, the second battery 17b, and the transistors 54a and 54b.

(Activation of the Generator)

Figure 2:
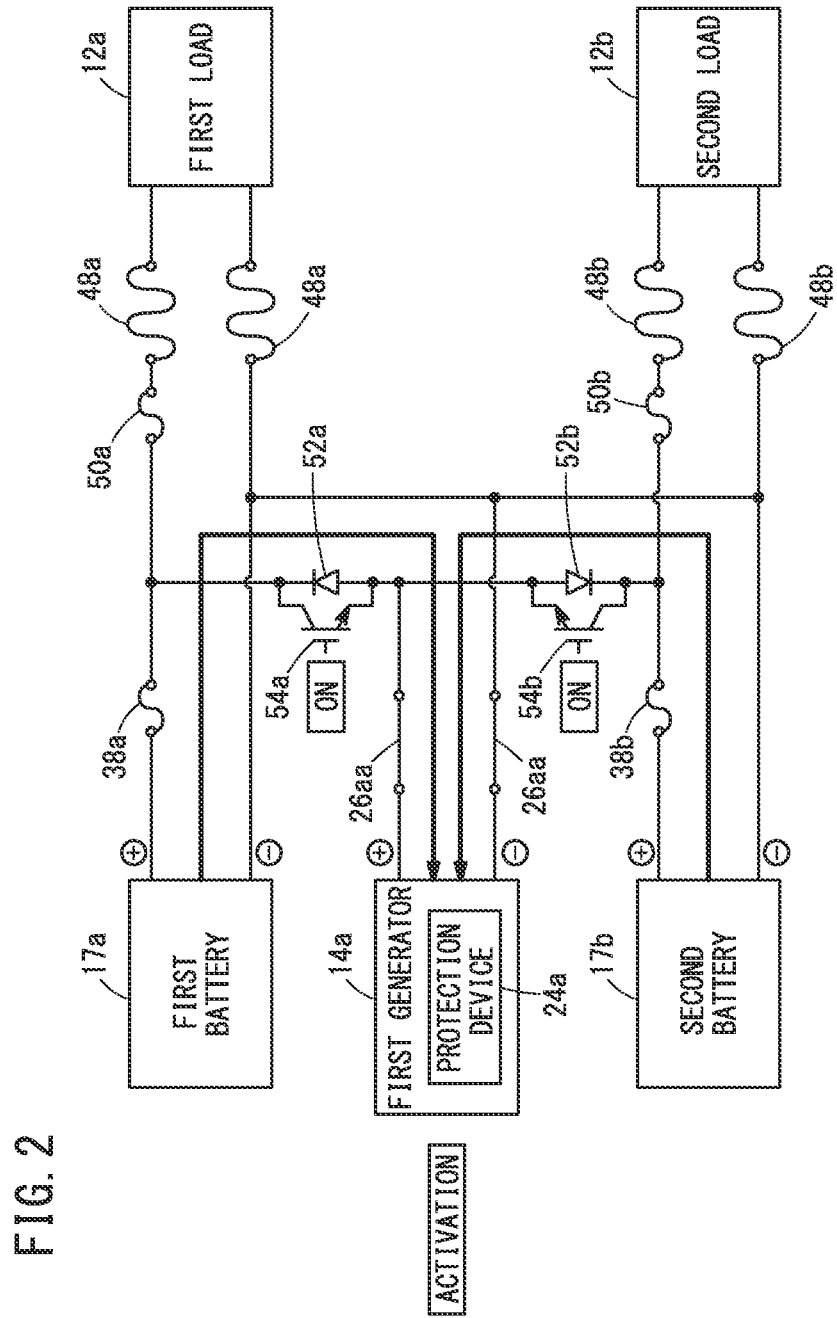
FIG. 2 is a diagram schematically showing a connection relationship in the power supply circuit.

The following describes the manipulation of the transistor 54a and the transistor 54b when the first generator 14a is activated by the power of the first battery 17a and second battery 17b. FIG. 2 is a schematic diagram of the power supply circuit 10.

In this case, the power supply circuit 10 turns ON the transistor 54a and the transistor 54b. Due to this, power is supplied to the first generator 14a from the first battery 17a through the transistor 54a. Furthermore, power is supplied to the first generator 14a from the second battery 17b through the transistor 54b. The first generator 14a is activated by the power supplied from the first battery 17a and second battery 17b.

When the first generator 14a is activated, one of the transistor 54a and the transistor 54b may be turned ON while the other is turned OFF. In such a case, the first generator 14a is activated by the power supplied from the first battery 17a or the second battery 17b.

(Supply of Power to the Loads)

Figure 3:
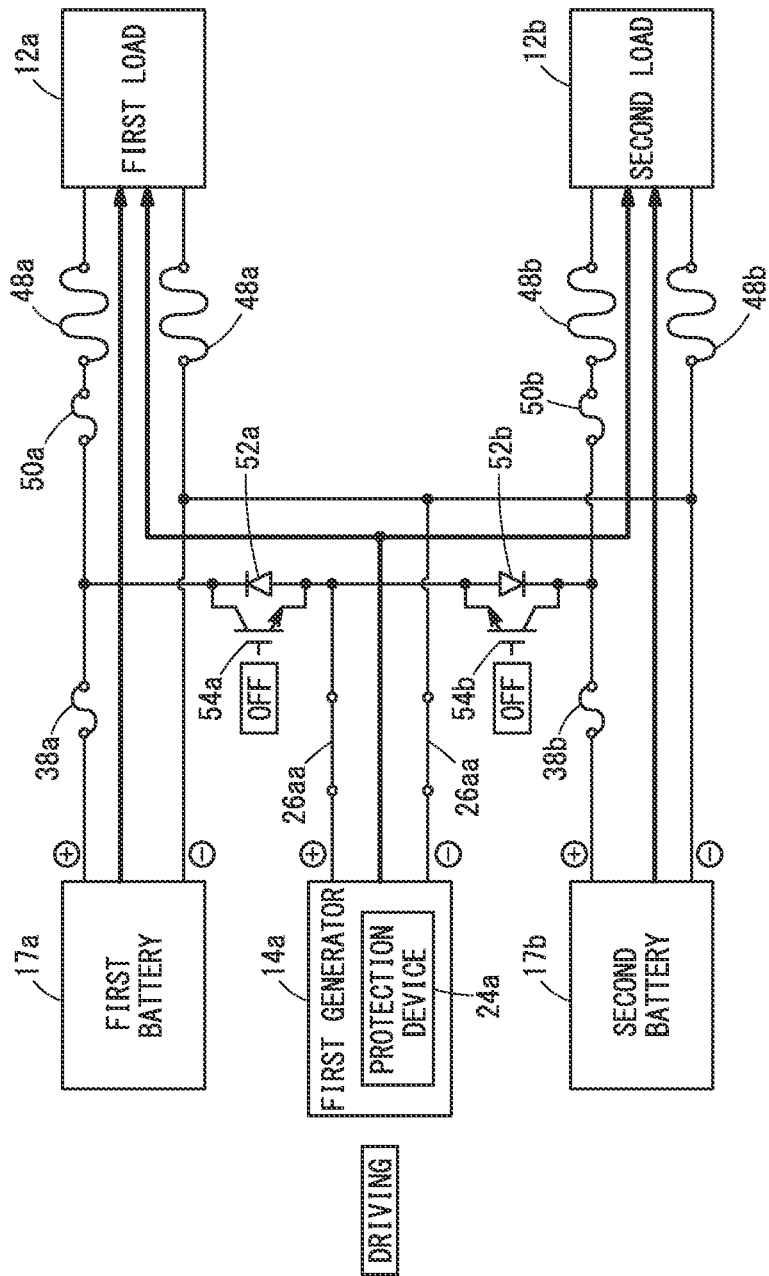
FIG. 3 is a diagram schematically showing a connection relationship in the power supply circuit.

The following describes the manipulation of the transistor 54a and the transistor 54b when power is supplied to the first load 12a and second load 12b from the first generator 14a. FIG. 3 is a schematic diagram of the power supply circuit 10.

In this case, the power supply circuit 10 turns OFF the transistor 54a and the transistor 54b. Due to this, power is supplied to the first load 12a from the first generator 14a through the diode 52a. Also, power is also supplied to the first load 12a from the first battery 17a as well. The first load 12a is driven by the power supplied from the first generator 14a and the first battery 17a.

Furthermore, power is supplied to the second load 12b from the first generator 14a through the diode 52b. Also, power is supplied to the second load 12b from the second battery 17b as well. The second load 12b is driven by the power supplied from the first generator 14a and the second battery 17b. Current does not flow to the first generator 14a from the first battery 17a or from the second battery 17b.

(Supply of Power to the Loads When an Abnormality Occurs in the Power Supply Circuit (1))

Figure 4:
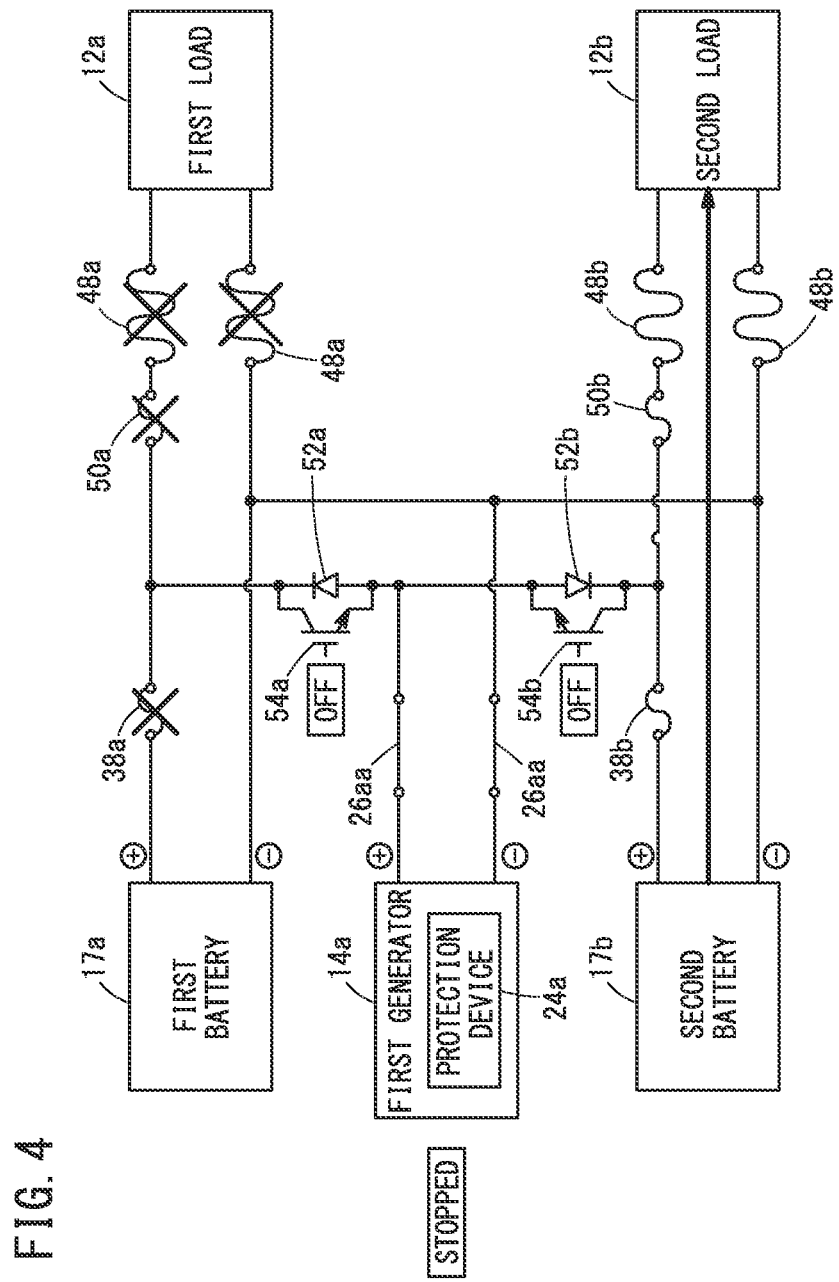
FIG. 4 is a diagram schematically showing a connection relationship in the power supply circuit.

The following describes the manipulation of the transistor 54a and the transistor 54b when an abnormality occurs in the power supply circuit 10. FIG. 4 is a schematic diagram of the power supply circuit 10.

A case where an abnormality occurs in the power supply circuit 10 can be, for example, a case where a short circuit occurs between the positive electrode and negative electrode of the load cable 48a, as shown in FIG. 4. When a short circuit occurs in the load cable 48a, for example, the battery fuse 38a and the load fuse 50a are cut off. Furthermore, the protection device 24a detects an overcurrent. Therefore, the protection device 24a stops the first generator 14a. At this time, since the transistor 54b is OFF, current does not flow from the second battery 17b to the load cable 48a. Therefore, the supply of power from the second battery 17b to the second load 12b is maintained.

A case where an abnormality occurs in the power supply circuit 10 can be, for example, a case where the positive electrode and negative electrode of the load cable 48b are short-circuited. When a short circuit occurs in the load cable 48b, the battery fuse 38b and the load fuse 50b are cut off. Furthermore, the protection device 24a detects an overcurrent. Therefore, the protection device 24a stops the first generator 14a. At this time, since the transistor 54a is OFF, current does not flow from the first battery 17a to the load cable 48b. Therefore, the supply of power from the first battery 17a to the first load 12a is maintained.

A case where an abnormality occurs in the power supply circuit 10 can be, for example, a case where the positive electrode and negative electrode of the PCU bus bar 26aa are short-circuited. When a short circuit occurs in the PCU bus bar 26aa, the protection device 24a detects an overcurrent. Therefore, the protection device 24a stops the first generator 14a. At this time, since the transistor 54a and the transistor 54b are both OFF, current does not flow from the first battery 17a and second battery 17b to the PCU bus bar 26aa side. Therefore, the supply of power from the first battery 17a to the first load 12a and the supply of power from the second battery 17b to the second load 12b are maintained.

(Reactivation of the Generators)

Figure 5:
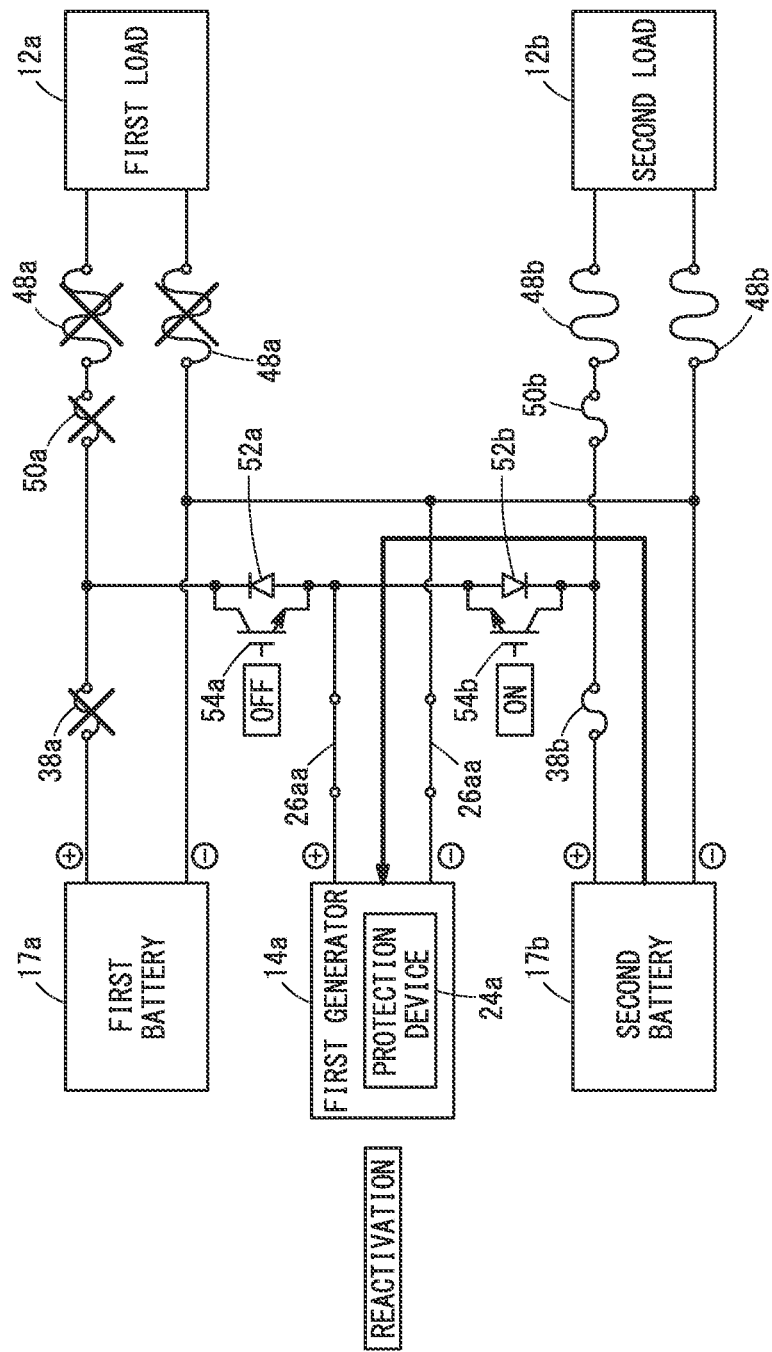
FIG. 5 is a diagram schematically showing a connection relationship in the power supply circuit.

The following describes the manipulation of the transistor 54a and the transistor 54b when the first generator 14a is reactivated. FIG. 5 is a schematic diagram of the power supply circuit 10.

As an example, in a case where the first generator 14a is reactivated in a state where the load cable 48a has shorted as shown in FIG. 5, the power supply circuit 10 turns ON the transistor 54b while keeping the transistor 54a OFF. The timing at which the transistor 54b is turned ON is a point in time after the load fuse 50a has been determined to be cut off. The cutoff of the load fuse 50a can be determined by monitoring the current flowing through the first load 12a with a current sensor, for example. At this time, since the transistor 54a is OFF, current does not flow from the second battery 17b to the load cable 48a. Therefore, power is supplied to the first generator 14a from the second battery 17b through the transistor 54b. The first generator 14a is activated by the power supplied from the second battery 17b.

As an example, in a case where the first generator 14a is reactivated in a state where the load cable 48b has shorted, the power supply circuit 10 turns ON the transistor 54a while keeping the transistor 54b OFF. The timing at which the transistor 54a is turned ON is a point in time after the load fuse 50b has been determined to be cut off. The cutoff of the load fuse 50b can be determined by monitoring the current flowing through the second load 12b with a current sensor, for example. At this time, since the transistor 54b is OFF, current does not flow from the first battery 17a to the load cable 48a. Therefore, power is supplied to the first generator 14a from the first battery 17a through the transistor 54a. The first generator 14a is activated by the power supplied from the first battery 17a.

As an example, when the PCU bus bar 26aa has shorted, the power supply circuit 10 keeps the transistor 54a and the transistor 54b OFF. At this time, the power supply circuit 10 cannot reactivate the first generator 14a. Therefore, the first load 12a is driven by the power supplied from the first battery 17a. Furthermore, the second load 12b is driven by the power supplied from the second battery 17b.

(Supply of Power to the Loads When an Abnormality Occurs in the Power Supply Circuit (2))

Figure 6:
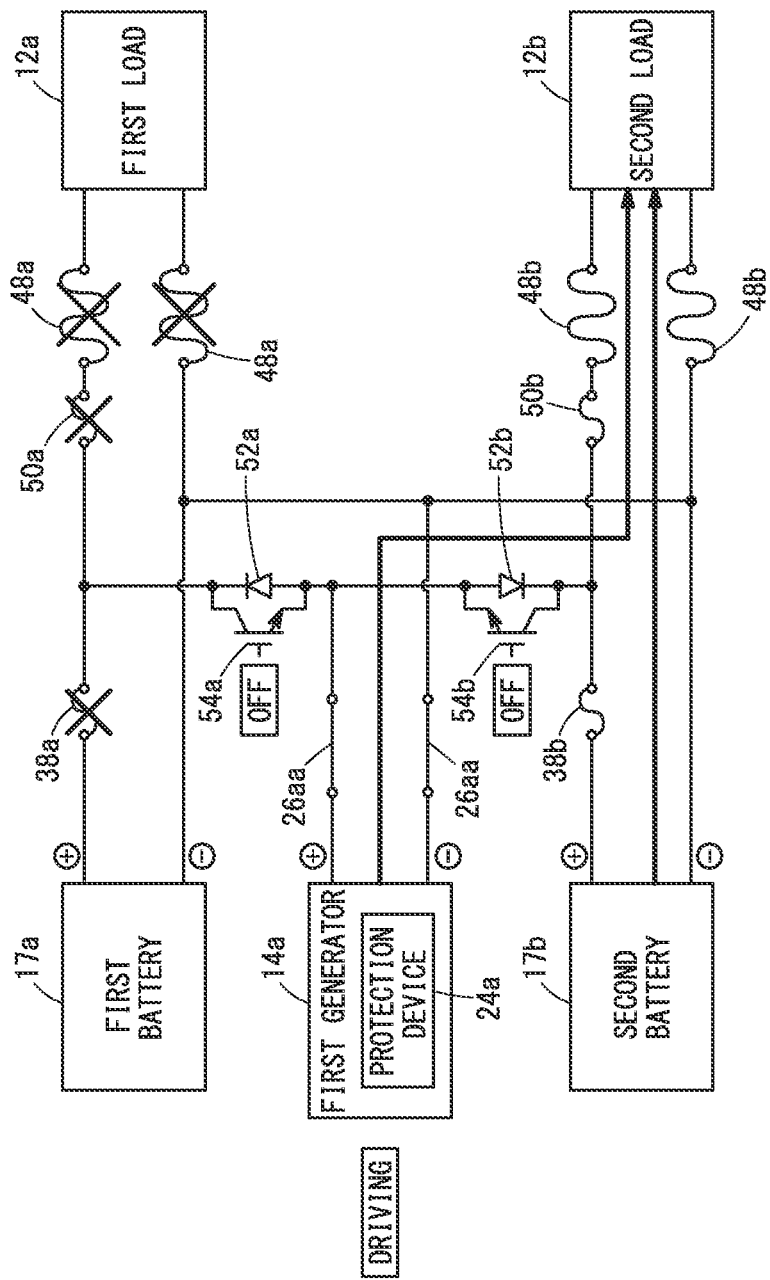
FIG. 6 is a diagram schematically showing a connection relationship in the power supply circuit.

The following describes the manipulation of the transistor 54a and the transistor 54b when an abnormality occurs in the power supply circuit 10. FIG. 6 is a schematic diagram of the power supply circuit 10.

As an example, in a case where the first generator 14a is reactivated in a state where the load cable 48a has shorted as shown in FIG. 6, the power supply circuit 10 turns OFF the transistor 54a and the transistor 54b. At this time, since the load fuse 50a has been cut off, power does not flow from the first generator 14a to the load cable 48a. On the other hand, power is supplied to the second load 12b from the first generator 14a through the diode 52b. Furthermore, power is supplied to the second load 12b from the second battery 17b. The second load 12b is driven by the power supplied from the first generator 14a and the second battery 17b.

Furthermore, in a case where the first generator 14a is reactivated in a state where the load cable 48b has shorted, the power supply circuit 10 turns OFF the transistor 54a and the transistor 54b. At this time, since the load fuse 50b has been cut off, power does not flow from the first generator 14a to the load cable 48b. On the other hand, power is supplied to the first load 12a from the first generator 14a through the diode 52a. Furthermore, power is supplied to the first load 12a from the first battery 17a. The first load 12a is driven by the power supplied from the first generator 14a and the first battery 17a.

(Supply of Power to the Loads When an Abnormality Occurs in the Battery)

Figure 7:
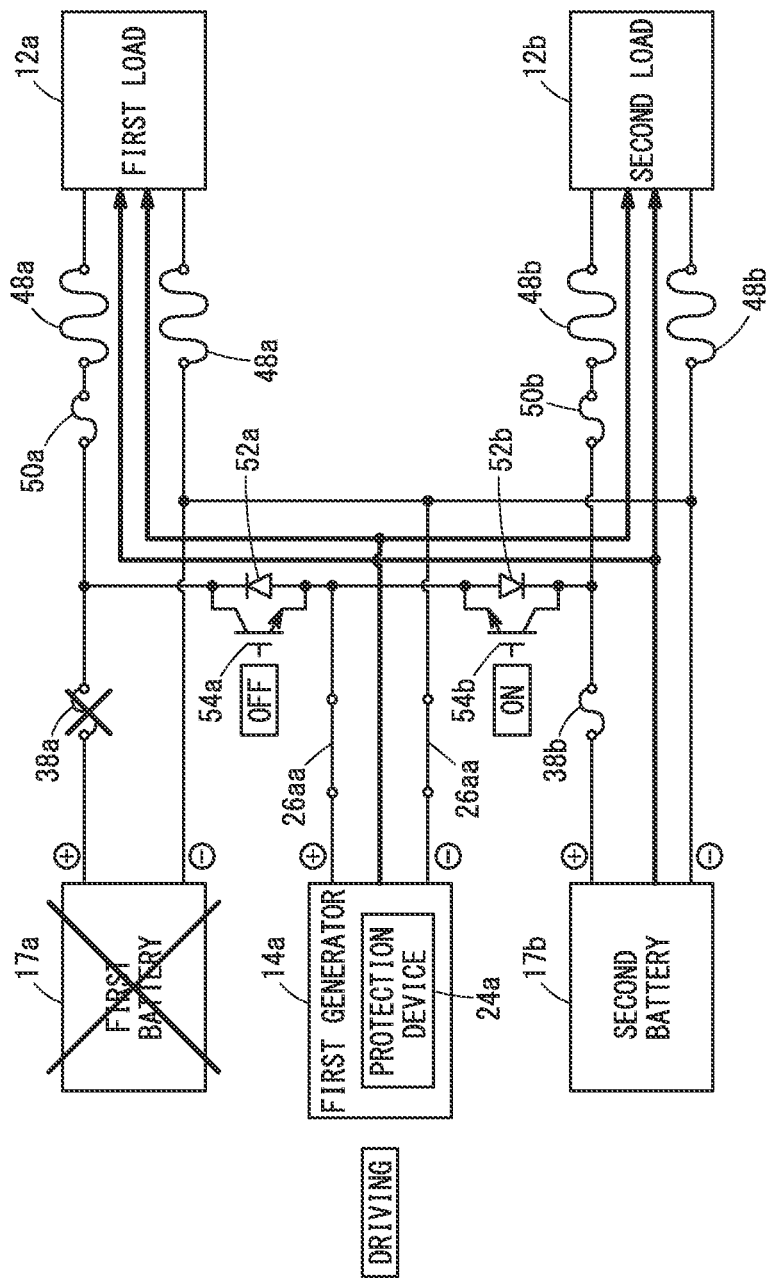
FIG. 7 is a diagram schematically showing a connection relationship in the power supply circuit.

The following describes the manipulation of the transistor 54a and the transistor 54b when an abnormality occurs in the first battery 17a or the second battery 17b. FIG. 7 is a schematic diagram of the power supply circuit 10.

A case in which an abnormality occurs in the first battery 17a can be a case where a short circuit occurs between the positive electrode and negative electrode inside the first battery 17a, for example. When the first battery 17a has shorted as shown in FIG. 7, the power supply circuit 10 turns ON the transistor 54b while keeping the transistor 54a OFF. The timing at which the transistor 54b is turned on is a point in time after the battery fuse 38a has been determined to be cut off. The cutoff of the battery fuse 38a can be determined by monitoring the current flowing through the first battery 17a with a current sensor, for example. At this time, since the battery fuse 38a is cut off, current does not flow to the first battery 17a from the first generator 14a and the second battery 17b.

As a result, power is supplied to the first load 12a from the first generator 14a through the diode 52a. Power is supplied to the first load 12a from the second battery 17b through the transistor 54b and diode 52a. The first load 12a is driven by the power supplied from the first generator 14a and the second battery 17b.

Furthermore, power is supplied to the second load 12b from the first generator 14a through the transistor 54b. Power is supplied to the second load 12b from the second battery 17b. The second load 12b is driven by the power supplied from the first generator 14a and the second battery 17b.

A case in which an abnormality occurs in the second battery 17b can be a case where a short circuit occurs between the positive electrode and negative electrode inside the second battery 17b, for example. When the second battery 17b has shorted, the power supply circuit 10 turns ON the transistor 54a while keeping the transistor 54b OFF. The timing at which the transistor 54a is turned on is a point in time after the battery fuse 38b has been determined to be cut off. The cutoff of the battery fuse 38b can be determined by monitoring the current flowing through the second battery 17b with a current sensor, for example. At this time, since the battery fuse 38b is cut off, current does not flow to the second battery 17b from the first generator 14a and the second battery 17b.

As a result, power is supplied to the second load 12b from the first generator 14a through the diode 52b. Power is supplied to the second load 12b from the first battery 17a through the transistor 54a and diode 52b. The second load 12b is driven by the power supplied from the first generator 14a and the first battery 17a.

Furthermore, power is supplied to the first load 12a from the first generator 14a through the transistor 54a. Power is supplied to the first load 12a from the first battery 17a. The first load 12a is driven by the power supplied from the first generator 14a and the first battery 17a.

[Operational Effect]

In the power supply circuit 10 of the present embodiment, in order to create a failsafe, each of a plurality of generators (first generator 14a and second generator 14b) can supply power to all of the loads (first load 12a, second load 12b, and third load 12c). Therefore, even when an abnormality occurs in some of the generators, it is possible to maintain the supply of power with the other generators.

Furthermore, in the power supply circuit 10 of the present embodiment, each of the plurality of loads (first load 12a, second load 12b, and third load 12c) is provided with a battery (first battery 17a, second battery 17b, and third battery 17c) that is a dedicated power source. Each load is precharged by the power of each battery. Furthermore, when the first generator 14a and the second generator 14b have failed, each load operates using the power of each battery. Furthermore, the generators are activated by the power of each battery.

Even in a state where an abnormality such as a short circuit has occurred in a conduction path for supplying power to some of the loads, the power supply circuit 10 must maintain the supply of power to the other loads.

Therefore, the power supply circuit 10 includes the diodes 52a, 52b, and 52c between the generators 14 and the load cables 48. The diodes 52a, 52b, and 52c allow the flow of current from the generators 14 to the load cables 48. On the other hand, the diodes 52a, 52b, and 52c regulate the flow of current from the load cables 48 to the generators 14. Furthermore, the power supply circuit 10 of the present embodiment includes the transistors 54a, 54b, and 54c in parallel with the respective diodes 52a, 52b, and 52c. In a case where power is to be supplied from the generators 14 to the loads 12, the transistors 54a, 54b, and 54c are turned OFF.

Due to this, even when the load cable 48a has shorted, for example, the electricity of the second battery 17b and third battery 17c does not leak from the load cable 48a. Therefore, the supply of power from the second battery 17b to the second load 12b is maintained. Furthermore, the supply of power from the third battery 17c to the third load 12c is maintained.

The power supply circuit 10 of the present embodiment turns ON the transistor 54a when power is to be supplied from the first battery 17a to the first generator 14a or the second generator 14b. Furthermore, the power supply circuit 10 turns ON the transistor 54b when power is to be supplied from the second battery 17b to the first generator 14a or the second generator 14b. The power supply circuit 10 turns ON the transistor 54c when power is to be supplied from the third battery 17c to the first generator 14a or second generator 14b.

Due to this, it is possible to supply power to the first generator 14a and the second generator 14b from each of the first battery 17a, the second battery 17b, and the third battery 17c. Therefore, it is possible to activate the first generator 14a and the second generator 14b.

When the load cable 48a has shorted, the power supply circuit 10 of the present embodiment turns ON the transistor 54b and the transistor 54c after the load fuse 50a has been determined to be cut off. Due to this, it is possible to supply power from the second battery 17b and the third battery 17c to the first generator 14a and the second generator 14b. Therefore, the first generator 14a and the second generator 14b can be reactivated. Furthermore, while the first generator 14a and the second generator 14b are stopped, it is possible to maintain the supply of power from the second battery 17b to the second load 12b. While the first generator 14a and the second generator 14b are stopped, it is possible to maintain the supply of power from the third battery 17c to the third load 12c.

In the same manner, when the load cable 48b has shorted, the power supply circuit 10 of the present embodiment turns ON the transistor 54a and the transistor 54c after the load fuse 50b has been determined to be cut off. Due to this, it is possible to supply power from the first battery 17a and the third battery 17c to the first generator 14a and the second generator 14b. Therefore, the first generator 14a and the second generator 14b can be reactivated. Furthermore, while the first generator 14a and the second generator 14b are stopped, it is possible to maintain the supply of power from the first battery 17a to the first load 12a. While the first generator 14a and the second generator 14b are stopped, it is possible to maintain the supply of power from the third battery 17c to the third load 12c.

Furthermore, when the load cable 48c has shorted, the power supply circuit 10 of the present embodiment turns ON the transistor 54a and the transistor 54b after the load fuse 50c has been determined to be cut off. Due to this, it is possible to supply power from the first battery 17a and the second battery 17b to the first generator 14a and the second generator 14b. Therefore, the first generator 14a and the second generator 14b can be reactivated. Furthermore, while the first generator 14a and the second generator 14b are stopped, it is possible to maintain the supply of power from the first battery 17a to the first load 12a. While the first generator 14a and the second generator 14b are stopped, it is possible to maintain the supply of power from the second battery 17b to the second load 12b.

For the batteries 17, it is sufficient to be capable of guaranteeing both a power amount making it possible to drive the loads 12 from when the generators 14 are stopped to when the generators 14 are reactivated and a power amount making it possible to reactivate the generators 14. Therefore, it is possible to reduce the power capacity of each of the first battery 17a, the second battery 17b, and the third battery 17c. As a result, it is possible to reduce the volume of each of the first battery 17a, the second battery 17b, and the third battery 17c.

Technical Concepts Obtainable from the Present Embodiment

The following is a record of technical concepts that can be understood from the embodiment described above.

A power supply circuit comprises a first conduction path (48a) that electrically connects a first power storage section (17a) and a first load (12a); a second conduction path (48b) that electrically connects a second power storage section (17b) and a second load (12b); a power generator (14a) that supplies power to the first load and the second load, through the first conduction path and the second conduction path; a first element (52a) that is provided in series between the power generator and the first conduction path, allows the flow of current from the power generator side to the first conduction path side, and regulates the flow of current from the first conduction path side to the power generator side; a second element (52b) that is provided in series between the power generator and the second conduction path, allows the flow of current from the power generator side to the second conduction path side, and regulates the flow of current from the second conduction path side to the power generator side; a first switch (54a) that is provided in parallel with the first element and switches between ON, which electrically connects the power generator and the first conduction path, and OFF, which electrically disconnects the power generator from the first conduction path; and a second element (54b) that is provided in parallel with the second element and switches between ON, which electrically connects the power generator and the second conduction path, and OFF, which electrically disconnects the power generator from the second conduction path, wherein, when power is to be supplied from the power generator to the first load and the second load, the first switch and the second switch are turned OFF.

In the power supply circuit described above, when power is to be supplied to the power generator from the first power storage section, the first switch may be turned ON; and when power is to be supplied to the power generator from the second power storage section, the second switch may be turned ON.

In the power supply circuit described above, the generator may include a protection device (24a) that stops driving of the power generator when overcurrent is detected, wherein: when an abnormality occurs in the first conduction path, the second switch may be turned ON and power may be supplied to the power generator from the second power storage section; and when an abnormality occurs in the second conduction path, the first switch may be turned ON and power may be supplied to the power generator from the first power storage section.

In the power supply circuit described above, when an abnormality occurs in the first conduction path, the second switch may be turned ON after the power generator has been electrically disconnected from the first conduction path, and power may be supplied to the power generator from the second power storage section; and when an abnormality occurs in the second conduction path, the first switch may be turned ON after the power generator has been electrically disconnected from the second conduction path, and power may be supplied to the power generator from the first power storage section.

In the power supply circuit described above, when an abnormality occurs in the first power storage section, the second switch may be turned ON after the first power storage section has been electrically disconnected from the first element, and power may be supplied to the first load from the second power storage section; and when an abnormality occurs in the second power storage section conduction path, the first switch may be turned ON after the second power storage section has been electrically disconnected from the second element, and power may be supplied to the second load from the first power storage section.

The present invention is not limited to the above-described embodiment, and various modifications can be made without departing from the gist of the present invention.

What is claimed is:

1. A power supply circuit comprising:
    a first conduction path that electrically connects a first power storage section and a first load;
    a second conduction path that electrically connects a second power storage section and a second load;
    a power generator that supplies power to the first load and the second load, through the first conduction path and the second conduction path;
    a first element that is provided in series between the power generator and the first conduction path, allows flow of current from the power generator side to the first conduction path side, and regulates flow of current from the first conduction path side to the power generator side;
    a second element that is provided in series between the power generator and the second conduction path, allows flow of current from the power generator side to the second conduction path side, and regulates flow of current from the second conduction path side to the power generator side;
    a first switch that is provided in parallel with the first element and switches between ON, which electrically connects the power generator and the first conduction path, and OFF, which electrically disconnects the power generator from the first conduction path; and
    a second switch that is provided in parallel with the second element and switches between ON, which electrically connects the power generator and the second conduction path, and OFF, which electrically disconnects the power generator from the second conduction path wherein: in a case where power is supplied directly from the power generator to the first load and the second load, the first switch and the second switch are turned OFF.

2. The power supply circuit according to claim 1, wherein:
    in a case where power is supplied to the power generator from the first power storage section, the first switch is turned ON; and in a case where power is supplied to the power generator from the second power storage section, the second switch is turned ON.

3. The power supply circuit according to claim 1, wherein:
    the generator includes a protection device that stops driving of the power generator in a case where overcurrent is detected, wherein:
    in a case where an abnormality occurs in the first conduction path, the second switch is turned ON and power is supplied to the power generator from the second power storage section; and
    in a case where an abnormality occurs in the second conduction path, the first switch is turned ON and power is supplied to the power generator from the first power storage section.

4. The power supply circuit according to claim 3, wherein:
    in a case where an abnormality occurs in the first conduction path, the second switch is turned ON after the power generator has been electrically disconnected from the first conduction path, and power is supplied to the power generator from the second power storage section; and
    in a case where an abnormality occurs in the second conduction path, the first switch is turned ON after the power generator has been electrically disconnected from the second conduction path, and power is supplied to the power generator from the first power storage section.

5. The power supply circuit according to claim 1, wherein:
    in a case where an abnormality occurs in the first power storage section, the second switch is turned ON after the first power storage section has been electrically disconnected from the first element, and power is supplied to the first load from the second power storage section; and
    in a case where an abnormality occurs in the second power storage section, the first switch is turned ON after the second power storage section has been electrically disconnected from the second element, and power is supplied to the second load from the first power storage section.

* * * * *